May 2, 1933.  L. YOST  1,907,230

PROTECTING AND COOLING MEANS FOR DYNAMO ELECTRIC MACHINES

Filed Jan. 31, 1929  2 Sheets-Sheet 2

INVENTOR
LLOYD YOST
BY Roy M Eilers
ATTORNEY

Patented May 2, 1933

1,907,230

UNITED STATES PATENT OFFICE

LLOYD YOST, OF CHICAGO, ILLINOIS, ASSIGNOR TO FAIRBANKS, MORSE & CO., OF CHICAGO, ILLINOIS, A CORPORATION OF ILLINOIS

PROTECTING AND COOLING MEANS FOR DYNAMO-ELECTRIC MACHINES

Application filed January 31, 1929. Serial No. 336,452.

This invention relates to improvements in protecting and cooling means for dynamo-electric machines, and more particularly to combined ventilating, cooling and protecting apparatus for electric motors.

An object of the present invention is to provide improved means for readily converting an open type motor into a motor of enclosed type, without thereby impairing the rating and efficiency of the motor.

A further object is to provide enclosing means of improved form and construction, which will serve, not only as a fan to cause a current of cooling air to be passed over the conducting parts of the motor, but which also includes provisions for effectively preventing the entrance of dirt or foreign matter to the live parts of the machine, from the surrounding atmosphere.

A still further object of the invention is attained in the provision of combined housing and cooling means applicable to dynamos and electric motors; such means being formed, for the most part, of a relatively thin, inexpensive sheet material, preferably metal of a high heat conductivity.

Figure 1:
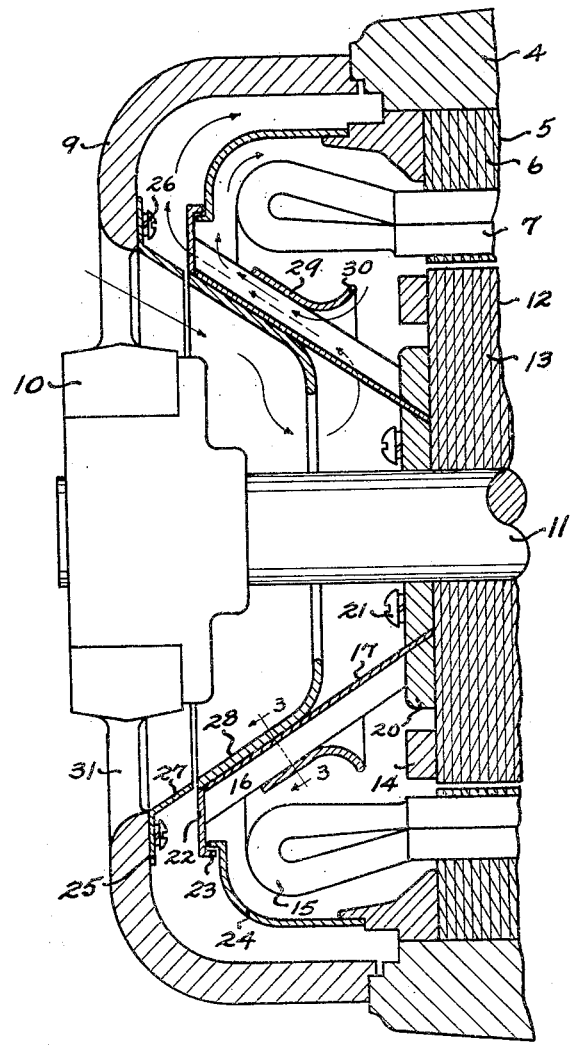
Figure 2:
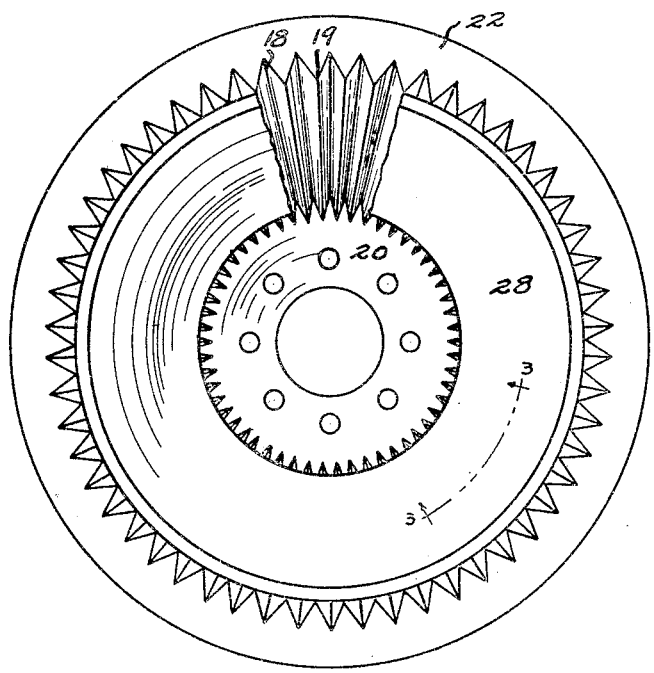
Figure 3:
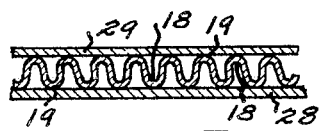

Further objects and advantages of the present invention will appear from the following detailed description of an illustrative example thereof, and from the accompanying drawings, in which:

Fig. 1 is a vertical sectional elevation of one end of an electric motor equipped according to the present invention; Fig. 2 is a side elevation of the rotating member, partly broken away to show the combined heat radiating and cooling elements, and Fig. 3 is a section taken along line 3—3, indicated in Figs. 1 and 2.

Proceeding now to the description of parts of the device, as illustrated by the accompanying drawings, 4 designates, generally, an electric motor which may be of any conventional construction, and which is provided with a stator 5, and a core 6, which includes the usual windings 7. The stator 5 comprises a part of, or is carried by and within the usual frame of the machine, having, in the present instance, end members 9 provided with bearing arms 10, in which may be fitted the motor bearings, of the usual association with the shaft 11. Secured to, and in rigid connection with the shaft is the rotor 12, comprising in the present example, a laminated core portion 13, which may be slotted in the usual manner to receive the rotor bars (not shown), each of which is in turn secured to end rings 14, only one of which is shown for convenience of illustration.

As thus far described, the parts of the motor are, or may be, of conventional construction. As particularly pertinent to the present improvements to be hereinafter described, it will be noted that the windings 7, associated with the stator core, terminate in the usual, laterally extending coiled portions 15.

The present improvements consist, in the case of a motor of the general type illustrated, in suitably mounting, by preference on the rotor of the machine, a disc-like shield 16 preferably formed of sheet metal of relatively high heat conductivity; for example, copper, aluminum, or suitable alloys of either of these metals. The radially innermost portion 17 of the shield, is shown as being substantially of frusto-conical form, this portion being radially corrugated, pleated, or fluted in a manner best appearing from the section shown in Fig. 3. The individual corrugations 18, thus constitute, with the adjacent material, air ducts or passages, and a plurality of combined fan blades and cooling fins or projections 19, the portions 18 and 19 being similarly presented on opposite faces of the portion 17. The portion of the disc or shield nearest the motor shaft, is secured, as a unit, to a collar or flange 20, which is, in the present instance, disposed adjacent the rotor 12. This collar has an opening of substantially the shaft diameter and is secured to the rotor by means of bolts or the like 21, which, by preference, extend through the collar 20 and partly into or completely through the adjacent rotor member.

The corrugated area of the shield and cooling member terminates outwardly in a substantially vertical flange 22, which is partly of serrated form, as best appears from Fig. 2, for a purpose which will hereinafter appear, and which terminates outwardly beyond the pleated portion 17 in an angulate or equivalent edge portion 23.

Having a substantially close, running fit with the edge portion 23, is a stationary shroud or shield 24, which is preferably smoothly curved, so as to present a convex exterior surface, and closely to overlie the extended coil portions 15 of the windings. This shield is secured, preferably at its outer margin, by suitable holding members, (not shown), or by welding.

For determining and directing the course of air through the end members of the machine, I prefer to provide an angulate sheet metal collar or flange 25, which may be secured inside the end member by means of holding means, such as screws 26. This collar has an internally presented portion 27, constituting substantially a fixed extension of the frusto-conical fluted portion 17, as will best appear from Fig. 1. The inwardly extended flange serves as an air baffle, and to this end, I prefer to extend the collar or flange inwardly just short of contact with the portion 22 at the outer end of the corrugated or fluted shield.

As a further means of determining the path of the cooling air, I may provide a cupped ring member or annulus 28, which may be formed either of sheet or cast metal, and which is secured as by welding, to the outer or lowermost face of the corrugated shield. The cupped annulus 28 extends radially inwardly, and has a trend from the adjacent portions of the corrugated shield, for a purpose more clearly described later. My preference is to form the innermost, depending projection of the cupped annulus, substantially of streamline section, to facilitate the passage of air about this portion.

Closely similar to, but somewhat smaller in size than the above described ring member 28, is a second member, serving substantially the same purpose, but secured to the upper or inner surface of the corrugated portion 17. The latter annulus, or baffle, 29, has an upstanding, inwardly projecting portion 30 streamlined similarly to the depending portion of member 28.

While for the sake of simplicity of illustration and description I have shown only one end of an electric motor provided with the present imrovements, it will be understood that the opposite end of the machine is similarly equipped, with the obvious result that the air between the shields and about the rotor and windings, is effectively pocketed or shielded against intermingling with the air outside of the opposed pair of shields. It will readily be understood that the presence and rotation of the pair of opposed dished fan members 16, creates air currents circulating, separately, within and without the space defined by the opposed members 16, thus effecting a secondary cooling of the live parts of the machine.

Of importance in the present example, is the effect of each of the cupped annular members in forcing the entrance of air into the corrugated, air cooling passages, at the innermost portions of the corrugations; thus compelling the air currents, from both the inside and outside of the described enclosure, to traverse the entire length of the corrugations or fluted portions. This circulation of air will be readily apparent from the arrows in Fig. 1. The air outside of the cooling member 16 enters the apertures 31 in the end members, and is deflected downwardly or inwardly toward the motor shaft, by the member 27, and annulus 28. Rotation of the shield or cooling member 16 causes a centrifugal fan effect, resulting in a negative air pressure about its inner portion, and a positive air pressure near the outer portions of corrugations 18, thus effecting a continuous circulation along the lines indicated; the outside cooling air being discharged through the usual openings (not shown) in the upper portion of the motor frame. The presence of the collar 27, as will be seen, prevents by-passage of the air currents in and out of the end member of the frame, without passing through the corrugated cooling member 16.

The air inside the opposed pair of cooling members 16, is in like manner continuously circulated along the lines indicated by the arrows, first entering the inwardly exposed corrugations of the cooling member 16, at the inner ends thereof, thence proceeding outwardly against the member 22 by which the air is deflected with cooling effect against the extended coiled portions 15 of the stator winding. Upon being heated and recirculated, a secondary cooling is effected by means of radiation or convection of heat from the internal air through the relatively thin sheet metal of the cooling member 16, the heat being taken up by the current of air circulated outside of the corrugated cooling members. I prefer so to dispose the ring members 28 and 29 on the corrugated portion 17, that the air-intake area of the corrugations, will substantially equal the areas of their respective outlet portions.

It will, of course, be understood that the streams of air circulating within and outside of the opposed cooling members 16 are kept entirely separate, so that it is impossible for any solids carried by the surounding air, to become lodged on any of the conducting portions of the motor.

In experimental use, the device described has been found to be easily applicable to motors of existing designs, and motors thus equipped have been found to be at least the full equivalent, so far as performance and characteristics are concerned, of the prevailing open types of motors, and to constitute a fulfilment of the objects set forth above.

I claim as my invention:

1. In combination with a dynamo electric machine, a cooling and protecting device driven by the rotor of said machine, said device including a rotatable fan member having air channels formed therein, closure means for portions of the channels, and air-directing means projecting from the body of the fan member.

2. In combination with a dynamo electric machine having a stator frame and a rotor, a rotatable fan member forming air channels, a partial-closure member for certain of the channels, and means projecting from the closure member, for directing air into the adjacent air channels, said fan member being driven by said rotor and located within the stator frame.

3. In combination with an electric machine having a stator and a rotor, a fan member having corrugations adapted to serve as air channels therein, and a combined closure member and air baffle, secured adjacent the corrugated portion and adapted partially to cover and to direct air into certain of said air channels, said fan member being driven by said rotor and baffle means carried by said stator and cooperating with said fan member.

4. In combination with a dynamo electric machine having a stator, windings thereon and a rotor, a secondary cooling and shielding device including a corrugated sheet metal fan element of imperforate construction, being rotatable with the machine, and the corrugations thereof forming fan blades and cooling fins; a cupped annular member disposed on each side of the fan element, each annular member constituting a partial cover for the corrugations on one side of the fan element, and including a streamlined projection adapted to direct air toward the radially innermost portions of each of said corrugations; an annular baffle member disposed between said fan element and an end member of the machine, and a stationary shield of sheet metal extending over the stator windings and terminating inwardly, substantially in engagement with the fan element, and adapted therewith to constitute an end closure member for the live parts of the machine.

5. In combination with a dynamo machine having a stator and a rotor, a fan member of dished construction and including fan blades, said fan member mounted on said rotor and within the stator frame, air directing means extending inwardly of the dished portion of said fan member, and away from the body of said fan member.

6. In combination with a dynamo machine having a stator frame and a rotor, a fan member of dished construction, fan blade portions formed thereon, and air directing means extending outwardly of the dished portion and away from said blade portion of the fan member, and baffle means carried by the stator frame and cooperating with said fan member.

7. In combination with a dynamo machine having a stator frame and a rotor, a corrugated sheet metal fan member, and a baffle carried thereby, said baffle having a trend away from said member and adapted to direct air toward certain of the corrugations of said fan member, said fan member being driven by said rotor and located within the stator frame.

8. In combination with a dynamo machine having a stator frame and a rotor, a fan member including fan blades, and relatively divergent projecting members carried by said fan and adapted to direct air onto said fan blades, said fan member mounted on said rotor and located within the stator frame.

9. In combination with a dynamo machine having a stator frame and a rotor, a fan member including fan blades, and relatively divergent projecting members carried on opposed faces of said fan member, and adapted to direct air inwardly along the fan radius, and against said blades, and baffle means carried by said stator frame cooperating with said fan member.

10. In combination with a dynamo machine, a rotatable fan member mounted on the rotor of said machine, fan blades on said member and disposed at an angle to its axis of rotation, and a baffle fixed to the end frame of the machine and having the same angle of inclination to the axis of rotation as the fan blades, and constituting substantially a fixed extension of the bladed portion of the fan member, said fan member being located within the stator frame.

LLOYD YOST.